United States Patent [19]
Higuchi et al.

[11] 3,764,668

[45] Oct. 9, 1973

[54] COMPOSITIONS OF SALTS OF SALICYLAMIDE

[75] Inventors: Takeru Higuchi; Anwar Hussain, both of Lawrence, Kans.

[73] Assignee: Interx Corporation, Lawrence, Kans.

[22] Filed: May 1, 1972

[21] Appl. No.: 249,007

Related U.S. Application Data

[63] Continuation-in-part of Ser. Nos. 22,049, March 23, 1970, abandoned, and Ser. No. 77,010, Sept. 30, 1970, Pat. No. 3,676,549.

[52] U.S. Cl. ................................ 424/44, 424/230
[51] Int. Cl. .............................................. A61k 9/00
[58] Field of Search ............................ 424/44, 230

[56] References Cited
UNITED STATES PATENTS

| | | | |
|---|---|---|---|
| 3,136,692 | 6/1964 | Bandelin | 424/44 |
| 2,904,469 | 9/1959 | Nashed | 424/80 |

OTHER PUBLICATIONS

Bates, T. R. et al., J. Pharm. Sci. 58:1468–1470 Dec. 1969, "correlation Between the Rate of Dissolution and Absorption of Salicylamide from Tablet and Suspension Dosage Forms"

*Primary Examiner*—Shep K. Rose
*Attorney*—Paul L. Sabatine et al.

[57] ABSTRACT

Pharmaceutical compositions of alkali metal salts of salicylamide are orally administered with significantly improved analgesic, anti-inflammatory, antipyretic and sedative results, as compared with solid oral dosage forms of both salicylamide and the alkali or alkaline earth metal salts of salicylamide. The compositions are administered as solutions formed by dissolving in an aqueous media a composition comprised of a unit dosage amount of an alkali metal salt of salicylamide, an effervescent couple and a nucleating inhibitor.

4 Claims, No Drawings

COMPOSITIONS OF SALTS OF SALICYLAMIDE

CROSS REFERENCE TO RELATED APPLICATION

This application is a continuation-in-part of our copending patent applications U.S. Ser. No. 22,049 filed on Mar. 23, 1970 now abandoned and United States Ser. No. 77,010 filed on Sept. 30, 1970 now U.S. Pat. No. 3,676,549, both assigned to the assignee of the present application.

BACKGROUND OF THE INVENTION

This invention relates to the administration of pharmaceutical or veterinary compositions. Especially it pertains to the administration of aqueous solutions of a unit dosage amount of an alkali metal salt of salicylamide for use as an analgesic, antipyretic, anti-inflammatory, or sedative. More especially, the invention pertains to the administration of such solutions formed from an effervescent composition which can be granular, a capsule, a pill or a compressed tablet.

Salicylamide is widely used in analgesic, anti-inflammatory, and antipyretic preparations. There are many conflicting reports, however, as to the efficacy of this drug. Salicylamide is a relatively insoluble drug, having a water solubility of only 0.2 percent at 30°C. When orally administered from tablets or capsules, a substantial amount of salicylamide fails to dissolve during passage through the gastrointestinal tract and can be recovered in the feces. Often as much as one-third of the drug is lost in this manner.

Additionally, a significant portion of the salicylamide which does go into solution is conjugated during absorption through the intestinal walls to its glucuronide and sulfate derivatives, neither of which has the desired pharmacological activity. Thus, very little of the salicylamide orally administered in solid dosage forms reaches the blood stream in active beneficially usable form.

When salicylamide is administered intravenously, it elicits excellent analgesic, anti-inflammatory, antipyretic and sedative responses. The relative strength of these responses is dose dependent. Because intravenous administration is impractical for most conditions of use, a need existed for a means of orally administering effective amounts of salicylamide.

In the aforementioned copending application, Ser. No. 22,049, the disclosure of which is hereby incorporated by reference and is relied upon, there is described and claimed a means of orally administering effective amounts of salicylamide in a beneficially usable form. The invention of said copending application, Ser. No. 22,049, resides in an orally administrable dosage unit for use as an analgesic, antipyretic, anti-inflammatory, or sedative comprising a unit dosage amount of an alkali or alkaline earth metal salt of salicylamide formulated with orally acceptable solid pharmaceutical carrier. In accordance with such invention, it was found that oral administration of alkali and alkaline earth metal salts of salicylamide from solid dosage forms, for example, tablets, pills, powders, capsules, and the like, provides therapeutically effective blood levels of salicylamide, substantially higher than when salicylamide itself is administered. Dosage forms containing these salicylamide salts have greater usefulness as analgesics, antipyretics, anti-inflammatories and sedatives than do similar dosage forms containing salicylamide. Moreover, the two long recognized major problems with oral salicylamide administration, namely, insolubility and conjugation during absorption, are both improved upon by the oral administration of these salts. Thus, alkali and alkaline earth metal salts of salicylamide dissolve substantially completely in the gastrointestinal tract and are readily available for absorption, essentially eliminating the problem of the drug simply passing through the gastro-intestinal tract. And, significantly, the greater availability of the drug to the wall of the small intestine overcomes the problem of inactivation by conjugation during absorption. This is especially true when the dosage unit is provided with an enteric coating that resists solution in gastric fluids but disintegrates in the small intestine. Through use of an enteric coating, the highly soluble salicylamide salt is presented to a relatively small area of the intestinal wall in high concentration. By presenting a quantity of drug higher than that which can be conjugated by the means available, the bulk of the salicylamide salt is absorbed in a free state. Thus, the large quantity of salicylamide salt presented to a small segment of the small intestine wall tends to overwhelm or swamp the inactivation mechanism.

While the orally administrable dosage unit of the aforesaid copending application, Ser. No. 22,049, represents a marked advance and contribution to the medical and veterinary arts, it has now unexpectedly been found, as first disclosed in our copending application, Ser. No. 77,010, that oral administration of an aqueous solution of an alkali metal salt of salicylamide, formed from an effervescent composition comprised of a unit dosage amount of the salt, provides significant further improvement in therapy, permitting much more rapid absorption and action, and hence therapeutically effective results followed by oral use of salicylamide. In this latter referenced application, Ser. No. 77,010, the disclosure of which is incorporated by reference and relied upon herein, there is described and claimed novel compositions comprising a salt of salicylamide, an effervescent couple and certain nucleator inhibitors which inhibitors act to substantially prevent the salicylamide salt from precipitating in an aqueous like environment. In the present application, it has unexpectedly found that other commercially available and relatively inexpensive compounds can be used as nucleator inhibitors to produce both new and useful effervescent compositions for salicylamide therapy to give a beneficial analgesic, anti-inflammatory, antipyretic or sedative effect.

SUMMARY OF THE INVENTION

Accordingly, it is an immediate object of the invention to provide a pharmaceutical or veterinary composition of matter comprising a salt of salicylamide, an effervescent couple and a nucleator inhibitor which composition is useful for a physiologic and pharmacologic effect in the management of health and disease.

It is a further object of this invention to provide a composition comprising a salt of salicylamide that overcomes the difficulties associated with the prior art.

Yet a further object of this invention is to provide an effervescent composition which, when completely dissolved in water and orally ingested, finds use as an analgesic, anti-inflammatory, antipyretic or sedative.

Another object of this invention is to provide an effervescent composition for effectively administering salicylamide.

Still another object of this invention is a significant improvement in salicylamide therapy by orally administering a sparkling aqueous solution of an alkali metal salt of salicylamide.

In attaining the objects of this invention, one feature resides in an effervescent composition comprised of a unit dosage amount of an alkali metal salt of salicylamide in an orally acceptable, solid pharmaceutical effervescent couple. Another feature resides in formulating the effervescent composition to contain a novel nucleator inhibitor to yield a composition that when dissolved in water produces an effervescing aqueous solution for use as an analgesic, antipyretic, anti-inflammatory or sedative.

Other objects, features and advantages of this invention will become more apparent to those skilled in the art from the detailed description of the invention which follows.

DESCRIPTION OF THE INVENTION

In accordance with this invention, it has been found that by orally administering an effervescing solution comprised of a unit dosage amount of an alkali metal salt of salicylamide, therapeutically effective results for the salicylamide are attained that are substantially higher than when salicylamide itself is administered and even significantly higher than when its alkali and alkaline earth metal salts are administered in solid oral dosage forms. Dosage forms containing the alkali metal salicylamide salts and characterized by the effervescent feature have far greater usefulness as analgesics, antipyretics, anti-inflammatories, and sedatives than do solid oral dosage forms containing salicylamide or the alkali and alkaline earth metal salts thereof and not characterized by an effervescent feature.

Salts of salicylamide useful for the purpose of the present invention can be represented by the generic formula:

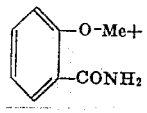

where Me is an alkali metal cation.

Suitable salts of the above formula are those which do not form insoluble salts with agents in the effervescent composition, resulting in sedimentation and eventual precipitation of the salicylamide. Various pharmaceutically acceptable alkali metal salts of salicylamide can be administered from solution. Of these, the sodium and potassium salts are preferred. Best results are obtained with the sodium salt.

While the orally administrable dosage unit of copending application, Ser. No. 22,049, improves upon both the problem of insolubility and conjugation during absorption, the invention of copending application, Ser. No. 77,010, goes even further by providing a means whereby compositions made into aqueous solutions of alkali metal salts of salicylamide are directly available for absorption, that is, an effervescent composition.

The effervescent composition of the invention, whether granular, a compressed tablet, a pill or a capsule, is prepared in a conventional manner from a mixture of an effervescent couple, an alkali metal salt of salicylamide, and a nucleating inhibitor.

The effervescent couple of the effervescent composition consists of at least one each of a solid acid and a solid basic material which when dissolved in an aqueous media, for example water, reacts with one another to produce carbon dioxide, $CO_2$, which causes effervescence. The acids that can be used are the pharmaceutically acceptable acids, including organic acids such as malic, fumaric, tartaric, itaconic, maleic, citric, adipic, succinic, malonic or mesaconic acid, and the like, and mixtures thereof, or a corresponding anhydride such as itaconic anhydride and citriconic anhydride and the like, and it can be inorganic acids such as acid sodium phosphate, sulfamic acid or a phosphonic acid derivative such as disclosed in U.S. Pat. No. 3,325,357. Acid salts can also be used such as the salts of commonly used organic food acids such as monosodium citrate, potassium acid tartrate, potassium bitartrate, and the like. The basic materials of the effervescent couple can be any of the pharmaceutically acceptable materials that react with the acid material with the release of carbon dioxide when contacted with an aqueous medium. These include metal carbonate salts such as alkali or alkaline earth metal carbonates and bicarbonates and mixtures thereof. Examples of suitable materials include lithium, sodium, potassium, magnesium and calcium carbonates, or bicarbonates thereof, ammonium carbonate, ammonium bicarbonate, ammonium sesquicarbonate, sodium mixtures thereof, and the like. The combination of certain of these acids and bases results in much more rapid effervescence when placed in water than do other members of the above groups. In particular, either citric acid, or a mixture of citric and tartaric acids, and sodium bicarbonate constitute a presently preferred couple due to their rapid reaction and consequent effervescence.

It will be understood that the range of solid acid and solid basic materials in the effervescent compositions of this invention is rather wide. Inasmuch as the exact proportions, or any particular acid or base, are not necessary, they may be widely varied to suit the exigencies of the occasion. The essentially dry effervescent couple, however, is of course substantially stoichiometrically balanced to produce an essentially neutral combination.

The effervescent compositions can additionally contain conventional pharmaceutical or veterinary additives such as diluents, binders, lubricants, disintegrators, coloring agents and the like. Typically, the amount of these additives can vary over a wide range, for example about 1 mg to 750 mg or higher for each pharmaceutical, effervescent composition, or from between about 0.1 percent to 20 percent by weight of the formulation. Typical diluents include dicalcium phosphate, calcium sulfate, lactose, kaolin, mannitol, sorbitol, dry starch, and powdered sugar. Typical binders include starch, gelatin, sugars such as sucrose, molasses, and lactose, natural and synthetic gums such as acacia, sodium alginate, extract of Irish moss, carboxymethylcellulose, methylcellulose, and polyvinylpyrrolidone, polyethylene glycol, ethylcellulose, and waxes. Typical lubricants for use in these dosage forms include boric acid, sodium benzoate, sodium acetate, sodium chloride, leucine, and polyethylene glycol. Disintegrators which can be present include such agents as starch, methylcellulose, agar, bentonite, cellulose and wood products, alginic acid, guar gum, citrus pulp carboxymethylcellulose, and sodium lauryl sulfate. If desired, conventional pharmaceutically acceptable dyes can be incorporated in the dosage unit. Typical surface active compounds include cetyldimethylbenzylammonium bromide, cetyltrimethylammonium bromide, and cetylpyridinum bromide. Typical buffering agents include glycine, alanine, glycylglycine and alanylalanine, and the like.

One important feature of the effervescent compositions of our copending application Ser. No. 77,010 is that it should contain a nucleating inhibitor, also referred to herein as a nucleating agent, or nucleation inhibiting agent, for example, polyvinylpyrrolidone, methylcellulose or gelatin, which nucleating inhibitor acts to substantially prevent the precipitation of free salicylamide resulting from the conversion of the salicylamide salt to its corresponding acid at a pH of 1 to 8. While the above nucleating inhibitors, as disclosed in Ser. No. 77,010, were a valuable contribution and advance in the art, it has now been unexpectedly found that the now described pharmaceutically acceptable compounds are suitable nucleating inhibitors for the purpose of the present invention. Other nucleating inhibitors according to this present invention include the water soluble synthetic cellulose compounds ethylhydroxyethylcellulose, hydroxyethylcellulose, and sodium carboxymethylcellulose, water soluble naturally occurring exudate from vegetation such as gum arabic, gum karaya and gum tragacanth, water soluble sea weed product such as agar-agar and carrageen, glycol compounds such as glycerine, propylene glycol and polyethylene glycol, and complexing agents such as caffeine and xanthene. Other suitable nucleating inhibitors similar to those above listed can be used according to the mode and manner of the invention and these include polyvinylmethyl ether, polyethylene oxide, locust bean gum, casein and nucleating inhibitors that would be obvious to those skilled in the art. The amount of nucleating inhibitor incorporated in the effervescent composition is not critical and it can vary widely. Typically, however, the nucleating inhibitor comprises from between about 0.1 percent to about 2.0 percent, by weight, of the formulation, or about 1 mg to 1000 mg for each effervescent composition.

As hereinbefore mentioned, the effervescent composition, whether granular, a compressed tablet, a pill, formed into a fiber, suppository or a capsule, is prepared in a conventional manner, as for example in *Remington's Pharmaceutical Sciences*, 1970, Mack Publishing Co., Easton, Pennsylvania. Those skilled in the art are well aware of the standard techniques which can be used to prepare these solid dosage forms.

Alkali metal salicylamide salts are administered according to this invention in the same unit dose amounts conventionally used with salicylamide. In general each dosage unit for eliciting the desired pharmacological response contains from 50 milligrams to 2 grams of the salicylamide salt. Typically, the dose for an adult human is about 300 milligrams administered three to five times a day incorporated in the dosage unit. Usual daily dosage of the alkali metal salicylamide salts described in more detail also corresponds to that conventionally associated with salicylamide, as set forth in the *National Formulary*, Thirteenth Edition, pages 627 and 628, 1970, published by The American Pharmaceutical Association, Washington, D.C., namely up to a total of no more than about 15 grams. Typical veterinary dose for sheep and swine is about 1 to 5 grams one to two times a day, for dogs about 0.25 to 1.0 grams one to two times a day, for cats about 100 to 200 mg. one to two times a day, and the like.

Alkali metal salicylamide salts can be administered in conjunction with other drugs to obtain enhanced efficacy. When this is done, the amount of the alkali metal salicylamide salt in the dosage unit can vary from the ranges previously set forth and the amount to be administered can be readily determined by those skilled in the art. Typical of other drugs that can be combined with the alkali metal salts of salicylamide to provide a combination dosage unit are: phenacetin, aspirin, sodium salicylate, caffeine, acetaminophen, scopolamine, phenylephrine hydrochloride, glycerol guaiacolate, chlorpheniramine maleate, belladonna alkaloids, dextromethorphan hydrobromide, ephidrine hydrochloride, and phenylpropanolamine hydrochloride.

Unexpectedly good results are obtained when an alkali metal salicylamide salt is combined with an alkali or alkaline earth metal salt of acetominophen having the formula:

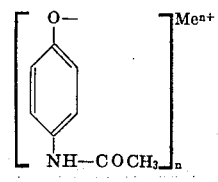

wherein Me is an alkali or alkaline earth metal cation of valence $n$ and $n$ is 1 or 2. Such dosage forms, containing salts of both drugs, are prepared in a conventional manner, as described above. The mole ratio of the salicylamide salt to the acetominophen salt can vary in the range of 0.25:1 to 4:1 but the total unit dosage amount of drug should be from 50 milligrams to 2 grams. Though one can depart from these ranges, the therapeutic effect, a more beneficial oral use of drug, is not present.

The following examples will serve to illustrate the invention without in any way being limiting thereon.

EXAMPLES 1 and 2

| Components | Weight, Grams |
|---|---|
| (1) Sodium Salicylamide (dry powder) | 200 |
| (2) Sodium Bicarbonate (dry powder) | 477 |
| (3) Tartaric Acid (dry powder)* | 252 |
| (4) Citric Acid (anhydrous)* | 147 |
| (5) Nucleating Inhibitor | 15 |

* The proportions of tartaric acid and citric acid in these examples may be varied, if desired, but their combined acidity must be equivalent to the above total acidity for an approximately 1 Kg. formulation.

The components (3) and (4) were thoroughly mixed, and the admixture dampened with a granulating agent such as anhydrous methanol or acetone. The damp material was then panned through a No. 14 mesh sieve and dried for four hours at 40° – 50°C. Component (5), either hydroxy-ethylcellulose (Example 1) or carboxymethylcellulose (Example 2), was next dissolved into a 1:1 granulating mixture of methanol and acetone. The component (1) was then mixed with the component (2) and the nucleating inhibitor (5) solution added thereto. This damp material was also panned through a No. 14 mesh sieve and dried for four hours at 40° – 50°C. Mixing the two different granules provided an effervescent composition suitable for dissolving in an aqueous medium, for example water, and administering according to the invention.

EXAMPLES 3 and 4

| Components | Weight, Grams |
|---|---|
| (1) Sodium salicylamide | 200 |
| (2) Sodium Bicarbonate | 477 |
| (3) Tartaric Acid | 252 |
| (4) Citric Acid | 147 |
| (5) Nucleating Inhibitor | 15 |

In Examples 3 and 4, the procedure used in Examples 1 and 2 is followed to yield the desired effervescent composition. The nucleating inhibitor component (5) is a mixture of carboxymethyl cellulose and hydroxyethylcellulose in a 1:1 ratio, Example 3, and a mixture of hydroxyethylcellulose and gum arabic in a 3:2 ratio, Example 4.

EXAMPLES 5 and 6

| Components | Weight, Grams |
|---|---|
| (1) Potassium Salicylamide (dry powder) | 200 |
| (2) Potassium Carbonate (anhydrous) | 77 |
| (3) Potassium Bicarbonate (dry powder) | 400 |
| (4) Tartaric Acid | 252 |
| (5) Citric Acid (anhydrous) | 147 |
| (6) Nucleating Inhibitor | 15 |

The procedure used for formulating the compositions of Examples 5 and 6 is as set forth in Examples 1 and 2, except that component (6) consisted of gum tragacanth, and hydroxyethyl cellulose in a 1:4 ratio, Example 5 and caffeine in Example 6.

EXAMPLE 7

Other alkali metal salts of salicylamide can be formulated with a like or different effervescent couple in a similar manner as described in Examples 1 through 6.

To form tablets from an effervescent mixture such as that described above, the mixture should advantageously be in granular form in order that it will be sufficiently free-flowing to be easily fed to the die cavity of the tableting machine employed for shaping the tablets. Powders do not flow freely and these powders should be granulated in some convenient fashion. The usual methods of preparing such free flowing granulations include the heat fusion method, the use of steam or water injection, or the use of a double granulation method. As is known, when compressed tablets are made according to conventional procedure, lubricants must be added to the granulation to facilitate removal of the tablets from the die cavities of the tableting machine after compression. Exemplary of the conventional tableting machines, there may be mentioned hand punch, rotary and automatic. Any reasonable size and shape of tablet will yield a satisfactory product.

EXAMPLE 8

The following dry powdered components are thoroughly mixed in a laboratory v-blender in the stated porportions, with the particle size of the ingredients in the range of 50 to 200 mesh:

| Components | Percent |
|---|---|
| (1) Citric Acid Anhydrous | 63 |
| (2) Sodium Bicarbonate (dry) | 35 |
| (3) Nucleating Inhibitor | 1.5 |
| (4) Buffer | 0.5 |

Component (3) is hydroxypropylmethylcellulose and component (4) is glycine with the blended mixture processed by heating for 25 to 30 minutes at 110° to 120°C, to yield a solid, homogenous mixture at room temperature. The solid is next rotary granulated and redried for one hour at 70°C. Next, the dried granulation is added to the following:

| Components | Percent |
|---|---|
| (5) Granulation | 90.0 |
| (6) Sodium Salicylamide (dry) | 8.5 |
| (7) Flavor (spearmint) | 1.24 |
| (8) Dye (light blue) | 0.20 |
| (9) Stannous fluoride | 0.06 |

The mixture is thoroughly blended and compressed into tablets by a rotary tableting machine. The tablets produced are three-fourths of an inch in diameter, 5/10 of an inch thick, weigh 2.3 grams and have a Strong Cobb hardness of 3–6.

To demonstrate that sodium salicylamide would have improved bioavailability when used for the purpose of the invention, the dissolution rates of sodium salicylamide were compared to salicylamide by using 300 milligram half-inch diameter tablets having a thickness of 1 millimeter, and prepared with a Carver Press at 10 pounds per square inch pressure. When placed in simulated gastric fluid (400 milliliters, 0.1 Normal HCl) at 37°C in a round bottom flask magnetically stirred at 60 RPM, the results set forth in Table 1 were obtained.

TABLE 1

| Elapsed Time | Percent Dissolved Sodium Salicylamide | Salicylamide |
|---|---|---|
| 1 min. | 16 | <1 |
| 2 min. | 34 | <1 |
| 5 min. | 68 | 1 |
| 11 min. | 97 | 1 |
| 20 min. | 100 | 2 |
| 1 hr. | — | 5 |
| 2 hr. | — | 18 |
| 4 hr. | — | 32 |
| 8 hr. | — | 54 |
| 20 hr. | — | 88 |
| 40 hr. | — | 97 |
| 44 hr. | — | 100 |

When the dissolution rate for tablets prepared in an identical manner were tested, to indicate the bio-availability of sodium salicylamide, under the same conditions in simulated intestinal fluid (6.80 parts monobasic potassium phosphate, 1.52 parts sodium hydroxide, 1000 parts distilled water) of pH 7.5, the following results were obtained, as set forth in Table 2.

TABLE 2

| Elapsed Time | Percent Dissolved Sodium Salicylamide | Salicylamide |
|---|---|---|
| 1 min. | 15.0 | — |
| 5 min. | 78.5 | — |
| 10 min. | 96.8 | — |
| 15 min. | 98.5 | — |
| 20 min. | 100.0 | — |
| 25 min. | — | — |
| 30 min. | — | 6.2 |
| 4 hr. 35 min. | — | 33.4 |
| 17 hr. 5 min. | — | 89.5 |
| 24 hr. 10 min. | — | 93.0 |
| 26 hr. 25 min. | — | 96.5 |
| 46 hr. 30 min. | — | 100.0 |

To demonstrate the results obtained for sodium salicylamide compared to salicylamide a standard test for the incidence of loss of righting reflex is carried out in test animals. The test is performed with a mixed, 10 member colony of commercially available rats weighing about 150 to 200 grams. The sodium salicylamide and the salicylamide is mixed with 0.5 percent gum tragacanth and administered by gastric gavage at the rate of 1 ml per 100 grams of body weight. The test indicated a prostration dose, PD–50 for salicylamide is 875 (735 to 1040) mg/kg and for sodium salicylamide 570 (503 to 643) mg/kg, with a potency ratio of 1.54 (1.24 to 1.91) for sodium salicylamide.

In summary, effervescent compositions containing alkali metal salts of salicylamide are provided that can be dissolved in water and then orally administered for use as analgesic, antipyretic, anti-inflammatory and sedative effects. While the invention has been described and pointed out with reference to certain preferred embodiments thereof, those skilled in the art will appreciate that various changes and modifications and substitutions can be made without departing from the spirit of the invention. It is intended, therefore, that the invention be limited only by the scope of the claims which follow.

We claim:

1. A composition of matter which effervesces in an aqueous medium to produce an aqueous effervescing solution for oral administration as an analgesic, antipyretic, anti-inflammatory or sedative, comprising a unit dosage amount of an alkali metal salt of salicylamide in an orally acceptable pharmaceutical effervescent couple with an effective amount of ethylhydroxyethylcellulose, hydroxyethylcellulose, sodium carboxymethylcellulose, gum arabic, gum karaya, gum tragacanth, carrageen, caffeine, xanthine, locust bean gum, casein and polyethylene glycol that acts to substantially prevent the precipitation of free salicylamide resulting from the conversion of the salicylamide salt to its corresponding acid at a pH of 1 to 8.

2. The composition of matter as defined by claim 1 further comprising an alkali or alkaline earth metal salt of acetominophen.

3. The composition of matter as defined by claim 1 further comprising glycine, alanine, glycyglyane and alanylalanine.

4. An effervescing, aqueous solution for use as an analgesic, antipyretic, anti-inflammatory or sedative, comprised of water and the composition of matter as defined by claim 1.

* * * * *

UNITED STATES PATENT OFFICE
CERTIFICATE OF CORRECTION

Patent No. 3,764,668        Dated   October 9, 1973

Inventor(s)   Takeru Higuchi and Anwar Hussain

It is certified that error appears in the above-identified patent and that said Letters Patent are hereby corrected as shown below:

IN THE ASSIGNEE'S NAME:

Kindly amend the assignee of the above-identified patent to read:

-- INTERx Research Corporation --.

Signed and sealed this 8th day of October 1974.

(SEAL)
Attest:

McCOY M. GIBSON JR.
Attesting Officer

C. MARSHALL DANN
Commissioner of Patents